(12) United States Patent
Crawford et al.

(10) Patent No.: US 8,778,093 B2
(45) Date of Patent: *Jul. 15, 2014

(54) COATING REMOVAL COMPOSITION

(75) Inventors: Charles A. Crawford, Racine, WI (US); Carmine Savaglio, Kenosha, WI (US); Lance D. Brown, Racine, WI (US)

(73) Assignee: Diversey, Inc., Sturtevant, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/442,581

(22) Filed: Apr. 9, 2012

(65) Prior Publication Data

US 2012/0289446 A1 Nov. 15, 2012

Related U.S. Application Data

(60) Continuation of application No. 12/879,160, filed on Sep. 10, 2010, now Pat. No. 8,173,586, which is a division of application No. 11/712,774, filed on Mar. 1, 2007, now abandoned.

(51) Int. Cl.
| | |
|---|---|
| B08B 3/04 | (2006.01) |
| C11D 1/66 | (2006.01) |
| C11D 3/04 | (2006.01) |
| C11D 3/08 | (2006.01) |
| C11D 3/10 | (2006.01) |

(52) U.S. Cl.
USPC .......... 134/38; 134/39; 134/40; 134/42; 510/201; 510/202; 510/212; 510/214; 510/215; 510/421; 510/433; 510/499; 510/505; 510/506; 510/509

(58) Field of Classification Search
USPC ......... 510/201, 202, 212, 214, 215, 421, 433, 510/499, 505, 506, 509; 134/38, 39, 40, 42
See application file for complete search history.

(56) References Cited

U.S. PATENT DOCUMENTS

| | | | |
|---|---|---|---|
| 2,403,613 A | 7/1946 | Reynolds et al. | |
| 3,930,740 A * | 1/1976 | Bowman | 404/93 |
| 4,540,442 A | 9/1985 | Smith et al. | |
| 4,801,397 A | 1/1989 | Flanagan et al. | |
| 4,891,160 A | 1/1990 | Vander Meer | |
| 5,158,710 A * | 10/1992 | VanEenam | 510/264 |

(Continued)

FOREIGN PATENT DOCUMENTS

| | | |
|---|---|---|
| EP | 0164514 | 3/1985 |
| EP | 0164514 | 12/1985 |

(Continued)

OTHER PUBLICATIONS

Schwartz et al., "Surface Active Agents and Detergents", vol. II, Interscience Publishers Inc., 1958.

(Continued)

*Primary Examiner* — Gregory R Delcotto
(74) *Attorney, Agent, or Firm* — Michael Best & Friedrich LLP

(57) ABSTRACT

The present invention is directed to a coating removal composition comprising at least one weak metal binding agent, a solvent system comprising at least one alcohol or ester, and a corrosion inhibition system. A method of removing a coating from an intentionally colored concrete floor is also disclosed. Utilization of the method results in at least 70% retention of colorant component after stripping a coating from an intentionally colored concrete surface, such as a floor.

41 Claims, 1 Drawing Sheet

(56) References Cited

U.S. PATENT DOCUMENTS

| | | | |
|---|---|---|---|
| 5,310,496 A | 5/1994 | Taylor | |
| 5,567,247 A * | 10/1996 | Hawes et al. | 134/36 |
| 5,990,067 A * | 11/1999 | Franssen et al. | 510/240 |
| 6,539,366 B1 * | 3/2003 | Doyle et al. | 706/13 |
| 7,179,775 B2 | 2/2007 | Foster | |
| 7,658,805 B2 * | 2/2010 | Netherton | 134/34 |
| 8,173,586 B2 * | 5/2012 | Crawford et al. | 510/212 |
| 2003/0096726 A1 | 5/2003 | Smith et al. | |
| 2003/0148031 A1 | 8/2003 | Urbanek et al. | |
| 2004/0013796 A1 | 1/2004 | Metzger | |
| 2004/0151950 A1 * | 8/2004 | Good | 428/703 |
| 2004/0175407 A1 * | 9/2004 | McDaniel | 424/423 |
| 2004/0176263 A1 | 9/2004 | Filippini et al. | |
| 2004/0213750 A1 | 10/2004 | Bennett et al. | |
| 2005/0059565 A1 | 3/2005 | Sutton et al. | |
| 2005/0164902 A1 | 7/2005 | Man et al. | |
| 2005/0233925 A1 | 10/2005 | Foley et al. | |
| 2005/0245420 A1 | 11/2005 | Lewis et al. | |
| 2006/0047059 A1 | 3/2006 | Yoon et al. | |
| 2006/0063689 A1 * | 3/2006 | Netherton | 510/240 |
| 2006/0089281 A1 | 4/2006 | Gibson | |
| 2006/0117997 A1 | 6/2006 | Kim et al. | |
| 2006/0127569 A1 * | 6/2006 | Metzger | 427/140 |
| 2007/0123447 A1 * | 5/2007 | Killeen et al. | 510/475 |
| 2008/0015133 A1 | 1/2008 | Rigley et al. | |

FOREIGN PATENT DOCUMENTS

| | | |
|---|---|---|
| EP | 0293640 | 12/1988 |
| JP | 07-315962 | 12/1995 |
| JP | 2007315962 | 12/1995 |
| JP | 08-290984 | 11/1996 |
| JP | 2008290984 | 11/1996 |
| JP | 09-327652 | 12/1997 |
| JP | 2009327652 | 12/1997 |
| JP | 2001-033438 | 2/2001 |
| JP | 2001033438 | 2/2001 |
| JP | 2003-226584 | 8/2003 |
| JP | 2003226584 | 8/2003 |
| JP | 2005-029987 | 2/2005 |
| JP | 2005029987 | 2/2005 |
| JP | 2005-068887 | 3/2005 |
| JP | 2005068887 | 3/2005 |
| WO | 9630453 | 10/1996 |
| WO | WO 9630453 | 10/1996 |
| WO | 2006113144 | 10/2006 |
| WO | WO 2006113144 | 10/2006 |

OTHER PUBLICATIONS

International Search Report from the Korean Intellectual Property Office for PCT/US2008/055686, dated Aug. 13, 2008.
"Surface Active Agents and Detergents," vol. II by Schwartz, Perry and Berch, Interscience Publishers, Inc., 1958.
Non-Final Rejection for U.S. Appl. No. 12/879,160 dated Jul. 6, 2011.
Notice of Allowance with Examiner comments for U.S. Appl. No. 12/879,160 dated Jan. 6, 2012.
Non-Final Rejection for U.S. Appl. No. 11/712,774 dated May 10, 2010.
Examiner Interview Summary for U.S. Appl. No. 11/712,774 dated Jul. 21, 2010.

* cited by examiner

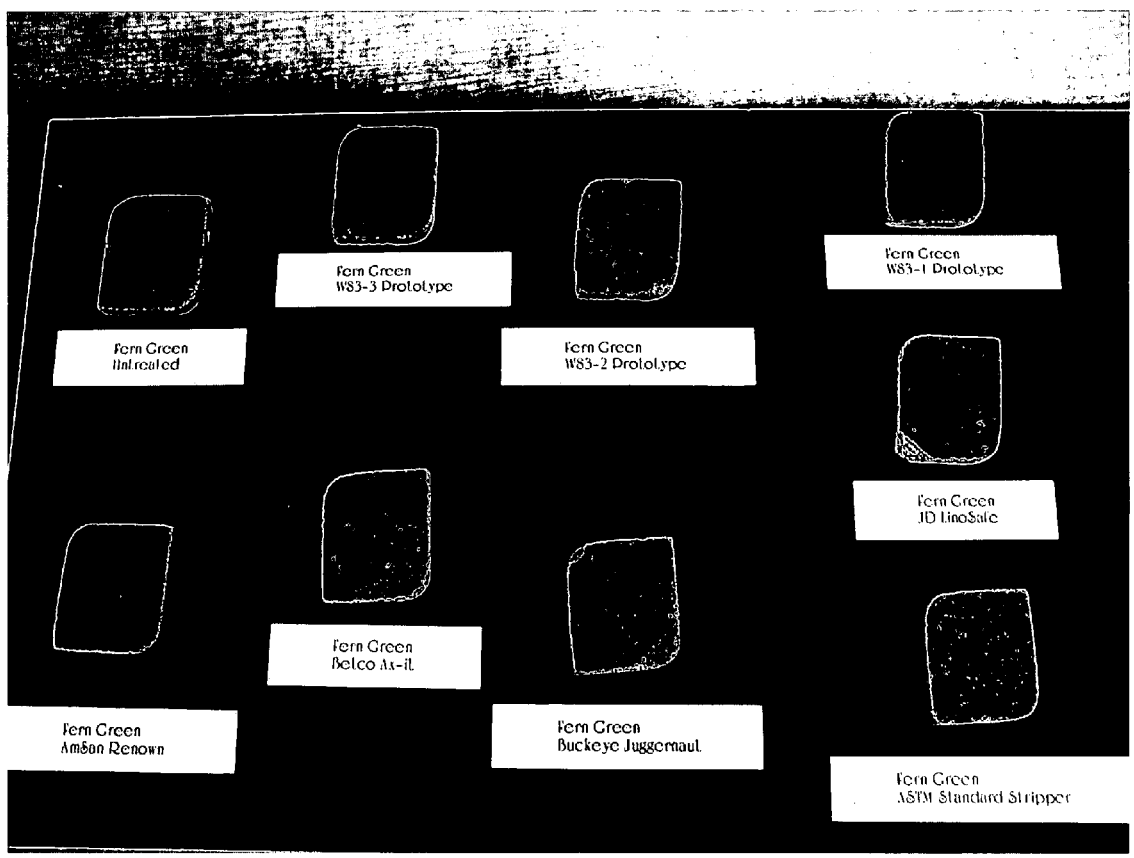

COATING REMOVAL COMPOSITION

CROSS-REFERENCE TO RELATED APPLICATIONS

This application is a continuation of U.S. patent application Ser. No. 12/879,160, filed on Sep. 10, 2010, now U.S. Pat. No. 8,173,586, which is a divisional application of U.S. patent application Ser. No. 11/712,774, filed on Mar. 1, 2007, now abandoned, each of which is incorporated by reference in its entirety.

FIELD OF THE INVENTION

The present invention relates generally to a composition for removing floor coatings, in particular, it relates to products and methods suitable for the removal of coatings from concrete floors, decorative concrete floors and floors utilizing cementatious matrices, such as terrazzo. More specifically, this invention relates to a coating removal composition that is safe for intentionally colored concrete substrates, such as those that are dyed, stained or otherwise treated with pigments.

BACKGROUND OF THE INVENTION

Concrete presents many unique challenges in terms of its protection. Concrete is a relatively porous substrate that is inherently alkaline in nature. As such, it is highly reactive to acids and is easily, unintentionally stained or otherwise soiled. Likewise, concrete is relatively soft and prone to wear and deterioration. Coatings are often used to protect concrete from wear, unintentional staining or soiling and acid etching. These coatings must be somewhat tolerant to the alkaline nature of concrete, and as a result are typically more difficult to remove than traditional styrene/acrylate based floor coatings. Furthermore, intentionally colored concrete flooring presents a unique challenge from the perspective of coating removal compositions in that traditional compositions that are effective for coating removal may damage or discolor such flooring. This often results in permanent, unsightly damage and/or necessitates the recoloring of the concrete at significant cost. This is largely the result of the highly alkaline nature of the coating removal compositions and the presence of relatively strong chelating agents, such as EDTA, etc., attacking the metal based colorant component of the intentionally colored concrete.

It, has been common to treat such concrete surfaces with semi-permanent coatings, such as those utilizing epoxy or urethane technologies. These coating systems suffer from their lack of removability and repairability. Likewise, they often require highly skilled or trained installers due to the sensitive nature of the application and the potentially hazardous profile of the chemistry involved. Such semi-permanent coatings are also expensive. Unfortunately, use of conventional removable coatings, such as acrylic based coatings, which are more cost effective, less labor intensive and utilize less hazardous chemistry has not heretofore provided satisfactory results because of the need for repeated, regular removal/stripping and reapplication. Such repeated removal or stripping with traditional strippers results in further, more extensive damage to the color component of the concrete flooring substrate because of more frequent use. Thus, there are a significant number of limitations with prior art coatings. Additionally the results are often unsatisfactory, in particular for intentionally colored concrete flooring, wherein the color is significantly diminished, discolored or entirely removed.

Previously, removal of coatings from decorative concrete substrates has been complicated due to the sensitive nature of the substrate to traditional chemistries used in coating removal compositions. Currently, coating removal compositions for intentionally colored or stained, decorative concrete are based on solvent systems that resemble heavy duty paint stripping products. These products prevent the displacement of metal ions that give the concrete its colorful look. The result of not using a product that is safe for color is gray concrete. Typically, such prior art strippers "safe" for colored concrete contain a blend of chemicals such as; N-methyl pyrolidone, methyl ethyl ketone, alkylene carbonates, dibasic ester mixtures, etc. These chemistries are undesirable for larger areas of removal, are difficult to work with, and potentially harmful if contact or inhalation has occurred. Clearly, a significant number of drawbacks are associated with prior art colored concrete coating strippers.

In summary, a considerable number of deficiencies exist in the art relating to the coating of concrete substrates and the subsequent removal of those coatings. This is particularly true in the case of intentionally colored, decorative concretes.

Accordingly, it is an object of the present invention to provide a coating removal composition wherein said composition provides good performance on the removal of coatings while reducing the damage such compositions impart to intentionally dyed, stained or pigmented substrates, such as decorative concrete. In particular, there is a need for an improved coating removal composition, which overcomes the shortcomings of the compositions of the prior art.

SUMMARY OF THE INVENTION

One aspect of the present invention provides a composition for removing floor coatings from cementatious, stone or concrete substrates. The coating removal compositions comprise at least one weak metal bonding agent, a solvent system comprising at least one alcohol or ester, and a corrosion inhibition system. Other optional components include water, surfactants, chelants, coupling agents and alkaline salts.

The coating removal compositions of the present invention include a weak metal binding agent. Such weak metal binding agents include ethoxylated amines. Suitable ethoxylated amines include primary and secondary ethoxylated amines having one of the following formulae:

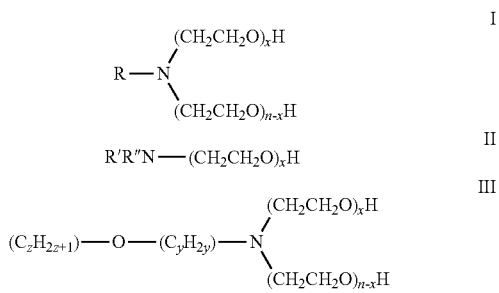

where R, R' and R" are independently C3-C26 alkyl, aryl or alkyl ether groups wherein y is an integer from 2 to 10, z is an integer from 1 to 20, such that y+z=6 to 26, x is an integer from 1 to 15 and n is an integer from 1 to 25.

Suitable amines include bis-(2-hydroxyethyl) isodecyloxypropylamine, poly (5)oxyethylene isodecyloxypropylamine, bis-(2-hydroxyethyl isodecyloxypropylamine, poly (5))oxyethylene isotridecyloxypropyl amine, bis-(2- hydroxyethyl) linear alkyloxypropylamine, bis(2-hydroxyethyl) soya amine, poly (15)oxyethylene soya amine, bis(2-hydroxyethyl) octadecylamine, poly (5)oxyethylene octadecylamine, poly (8)oxyethylene octadecylamine, poly (10)oxyethylene octadecylamine, poly (15)oxyethylene octadecylamine, bis(2-hydroxyethyl) octadecyloxypropylamine, bis-(2-hydroxyethyl) tallow amine, poly (5)oxyethylene tallow amine, poly (15)oxyethylene tallow amine, poly (3)oxyethylene 1,3 diaminopropane and bis(2-hydroxyethyl) coco amine and combination thereof.

In some embodiments, the weak metal binding agent comprises about 0.5 to 25.0 weight percent of the coating removal composition. In other embodiments, the weak metal binding agent is about 3.0 to 15.0 weight percent of the coating removal composition. In other embodiments, the weak metal binding agent is about 5.0 to 10.0 weight percent of the coating removal composition.

The coating removal composition of the present invention includes a solvent system comprising at least one alcohol or ester. The solvent system may include phthalates and/or pyrrolidone based solvents. Blends of various alcohols and/or esters, phthalates and pyrrolidone based solvents can also be utilized.

Suitable alcohols include polyhydric alcohols where the alcohol is an alkane polyol having from 2 to 6 carbon atoms and from 2-3 hydroxyls in the molecule. Suitable polyhydric alcohols include ethylene glycol, propylene glycol, dipropylene glycol, glycerin, 1,2-Butanediol, 1,3-Butanediol, 1,4-Butanediol, 2,3-Butanediol, 1,2-Propanediol, 1,5-Pentanediol, meso-erythritol, neopentyl glycol, pentaerythritol, and blends thereof.

Aromatic alcohol derivatives are also suitable for use in the solvent system. Suitable aromatic alcohols include benzyl alcohol, xylenol, phenol, etc. Exemplary solvents include but are not limited to glycol ether based solvents based on ethylene or propylene glycol such as ethylene glycol, propylene glycol, diethylene glycol ethyl ether, dipropylene glycol methyl ether, diethylene glycol methyl ether, diethylene glycol propyl ether, diethylene glycol butyl ether, ethylene/diethylene glycol 2-ethylhexyl ether, ethylene glycol phenyl ether, dipropylene glycol propyl ether, dipropylene glycol butyl ether, propylene glycol phenyl ether, and blends thereof.

Additionally, mono alcohols such as methanol, ethanol, propanol, isopropanol and butanol can be utilized in the solvent system.

Esters are also suitable for use in the solvent system. Suitable esters include glycol ether dibenzoates based on ethylene or propylene glycol including but not limited to propylene glycol dibenzoate, dipropylene glycol dibenzoate, polypropylene glycol dibenzoate, ethylene glycol dibenzoate, diethylene glycol dibenzoate, polyethylene glycol dibenzoate, neopentyl glycol dibenzoate, and the like as well as isodecyl benzoate, dipropylene glycol monomethyl ether benzoate, 2,2,4-trimethyl-1,3-pentanediol diisobutyrate and combinations thereof.

Phthalate based solvents including but not limited to dibutyl phthalate, butyl benzyl phthalate, diethyl phthalate, and combinations thereof may also be used. Optionally the solvent system can include pyrrolidone based solvents such as 2-pyrrolidone, N-methyl-2-pyrrolidone, N-octyl-2-pyrrolidone, N-dodecyl-2-pyrrolidone, and the like. The solvent system can also optionally include water.

In some embodiments of the coating removal composition, the solvent system can comprise about 0.50 to 98.5 weight percent of the coating removal composition. In still other embodiments, the solvent system comprises about 10.0 to 80.0 weight percent of the coating removal composition. In some embodiments, the solvent system is about 20.0 to 50.0 weight percent of the coating removal composition. Such solvents may be used alone or as blends.

The present coating removal composition also includes a corrosion inhibition system. Typically, the corrosion inhibition system includes heterocyclic organic materials, such as azoles, mercaptans, furans and combinations thereof. Such a corrosion inhibition system is present in an amount of about 0.05 to 25.0 weight percent of the coating removal composition. In some embodiments, the corrosion inhibition system comprises about 0.50 to 15.0 weight percent of the composition. In further embodiments of the coating removal compositions, the corrosion inhibition system is present in about 1.0 to 10.0 weight percent of the coating removal composition. Still other embodiments include about 2.0 to 5.0 weight percent of the coating removal composition. In some embodiments of the coating removal composition, the ratio of weak metal binding agent to corrosion inhibition system to is approximately 1:4.

The inventive coating removal composition may optionally include at least one inorganic alkaline salt. Such inorganic alkaline salts provide for a caustic material which is useful in emulsifying acid functional groups present in floor coating compositions. Suitable inorganic alkaline salts are selected from the group consisting of lithium carbonate, potassium carbonate, sodium carbonate, lithium hydroxide, potassium hydroxide, sodium hydroxide, lithium silicates, sodium silicates, potassium silicates, lithium phosphates in all forms, sodium phosphates, potassium phosphates, and combinations thereof. Such inorganic alkaline salt can be present in the composition in an amount of about 0.05 to about 15.0 weight percent of the composition. In alternative embodiments the inorganic alkaline salt is about 0.10-6.0 weight percent of the composition. In some embodiments, such inorganic alkaline salts comprise about 0.20 to 5.0 weight percent of the composition. In other embodiments, such inorganic alkaline salts comprise about 1.0 to 4.0 weight percent of the composition.

The invention also relates to a method of removing a coating from an intentionally colored concrete floor. The method involves applying a coating removal composition to an intentionally colored concrete floor, where the colored concrete floor has a colorant component. The coating removal composition is allowed to remain on the floor for a period of time and removed from the floor. In one embodiment, such method results in the intentionally colored concrete floor retaining at least 70% of the colorant component.

Other embodiments result in the intentionally colored concrete retaining at least 80% of the colorant component.

Still other embodiments of the method result in the intentionally colored concrete floor retaining at least 90% of the colorant component.

Other embodiments result in the intentionally colored concrete floor retaining at least 95% of the colorant component.

Further embodiments result in at least 99% of the colorant component being retained by the intentionally colored concrete floor.

The invention further relates to a spent coating removal composition exhibiting an absorbance of less than 0.05 in the wavelength range of 360 to 1100 nm.

DETAILED DESCRIPTION OF THE PREFERRED EMBODIMENT

The present invention is directed to an improvement in compositions for removing coatings from cementatious, natural stone or concrete substrates, particularly those concrete substrates that are intentionally colored, pigmented and/ or stained is having a colorant component therein or thereon. A define colorant component is intentionally added or applied pigments or dyes utilized to alter the visible color of the concrete from its natural appearance/color. The coating removal compositions of the present invention include at least one weak metal biding agent, a solvent system comprising at least one alcohol or ester, and a corrosion inhibition system.

The inventive compositions have been found to be less damaging to intentionally colored, stained or dyed decorative concrete floors or flooring substrates having a colorant component. Utilization of the inventive composition results in a significant reduction in damage, discoloration, or removal of the colorant component than prior art compositions to the substrate during removal of coatings, and in particular the colorant component thereof. Loss or reduction of color is just that, a loss of the visible color. In terms of damage and discoloration, damage and discoloration of intentionally colored substrates are evident by a visible change in the appearance of the substrate or a perceivable shift in the color thereof after treatment with stripper compositions of the prior art. This can, for example, result from interactions of various compositional components with the metal-based complexes used to impart color. It is theorized that strong metal binding agents, such as EDTA, bind to such metals resulting in a shift in the absorbance characteristics of the pigment and thus a shift in visible color. In some cases, the damage can be as severe as leaching of the metal from the substrate. The reduction in color removal of intentionally colored concrete by utilization of the inventive compositions was compared to prior art stripper or coating removal compositions.

The coating removal compositions or strippers of the present invention include a weak metal binding agent. Such weak metal binding agents include ethoxylated amines. Suitable ethoxylated amines include primary and secondary ethoxylated amines having one of the following formulae:

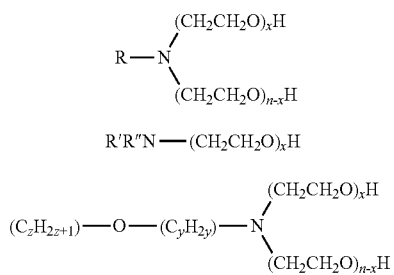

where R, R' and R" are independently C3-C26 alkyl, aryl or alkyl ether groups wherein y is an integer from 2 to 10, z is an integer from 1 to 20, such that y+z=6 to 26, x is an integer from 1 to 15 and n is an integer from 1 to 25.

Suitable amines include bis-(2-hydroxyethyl) isodecyloxypropylamine, poly (5)oxyethylene isodecyloxypropylamine, bis-(2-hydroxyethyl isodecyloxypropylamine, poly (5))oxyethylene isotridecyloxypropyl amine, bis-(2-hydroxyethyl) linear alkyloxypropylamine, bis(2-hydroxyethyl) soya amine, poly (15)oxyethylene soya amine, bis(2-hydroxyethyl) octadecylamine, poly (5)oxyethylene octadecylamine, poly (8)oxyethylene octadecylamine, poly (10)oxyethylene octadecylamine, poly (15)oxyethylene octadecylamine, bis(2-hydroxyethyl) octadecyloxypropylamine, bis-(2-hydroxyethyl) tallow amine, poly (5)oxyethylene tallow amine, poly (15)oxyethylene tallow amine, poly (3)oxyethylene 1,3 diaminopropane and bis(2-hydroxyethyl) coco amine and combinations thereof.

In some embodiments, the weak metal binding agent comprises about 0.5 to 25.0 weight percent of the coating removal composition. In other embodiments, the weak metal binding agent is about 3.0 to 15.0 weight percent of the coating removal composition. In still further embodiments, the weak metal binding agent is about 5.0 to 10.0 weight percent of the coating removal composition.

Solvent systems of the present invention include at least one alcohol or ester. Suitable alcohols include polyhydric alcohols, aromatic alcohols and mono or linear alcohols. Suitable esters include benzoates and dibenzoates. Optionally, phthalates or pyrrolidone based solvents may be utilized in some embodiments of the present invention. Blends of the various alcohols and esters have also been found to be useful in the solvent system.

Such a solvent system acts to help dissolve, penetrate and emulsify the coating. Further, it is believed that the solvent system enhances the activity of the other components by enhancing permeation of the materials into the coating film, such as corrosion inhibitors, inorganic alkaline salts, etc. They additionally enhance the performance of products by keeping the composition "wet" on the surface of the substrate. Such a solvent system acts as a carrier and assists in dissolving, emulsifying the coating or swelling and penetrating the coating until it is fully removed from the surface.

Suitable alcohols include the miscible polyhydric alcohols which are useful in the present invention are preferably miscible alkane polyols having from 2-6 carbon atoms and from 2-3 hydroxyls in the molecule. Examples of suitable polyhydric alcohols include ethylene glycol, propylene glycol, dipropylene glycol, glycerin, 1,2-Butanediol, 1,3-Butanediol, 1,4-Butanediol, 2,3-Butanediol, 1,2-Propanediol, 1,5-Pentanediol, meso-erythritol, neopentyl glycol, pentaerythritol, and blends thereof.

Suitable aromatic alcohols include benzyl alcohol, xylenol, phenol, etc. Exemplary solvents include but are not limited to glycol ether based solvents based on ethylene or propylene glycol such as ethylene glycol, propylene glycol, diethylene glycol ethyl ether, dipropylene glycol methyl ether, diethylene glycol methyl ether, diethylene glycol propyl ether, diethylene glycol butyl ether, ethylene/diethylene glycol 2-ethylhexyl ether, ethylene glycol phenyl ether, dipropylene glycol propyl ether, dipropylene glycol butyl ether, propylene glycol phenyl ether, and blends thereof.

Additionally, mono alcohols such as methanol, ethanol, propanol, isopropanol and butanol can be utilized.

Alternatively, the solvent system may include an ester. Suitable esters include glycol ether dibenzoates based on ethylene or propylene glycol including but not limited to propylene glycol dibenzoate, dipropylene glycol dibenzoate, polypropylene glycol dibenzoate, ethylene glycol dibenzoate, diethylene glycol dibenzoate, polyethylene glycol dibenzoate, neopentyl glycol dibenzoate, and the like as well as isodecyl benzoate, dipropylene glycol monomethyl ether benzoate, 2,2,4-trimethyl-1,3-pentanediol diisobutyrate.

Phthalate based solvents including but not limited to dibutyl phthalate, butyl benzyl phthalate, diethyl phthalate, and combinations thereof may also be used. Further, optionally the solvent system can include pyrrolidone based solvents such as 2-pyrrolidone, N-methyl-2-pyrrolidone, N-octyl-2-pyrrolidone, N-dodecyl-2-pyrrolidone, and the like.

The solvent system can also optionally include water. The combinations of these alcohols, esters and pyrrolidone based solvents and phthalates can also be utilized.

The solvent system comprises about 0.50 to about 98.5 weight percent of the coating removal composition. In some embodiments, the solvent system comprises about 10.0 to 80.0 percent of the coating removal composition. In some embodiments, the solvent system is about 20.0 to 50.0 weight percent of the coating removal composition. Such solvents may be used alone or as blends.

The inventive coating removal compositions also include a corrosion inhibition system. Such a corrosion inhibition system is useful in mitigating and/or minimizing damage and/or color loss to the concrete substrate that is being treated, in particular, intentionally colored, dyed, stained or pigmented concretes having a colorant component therein or thereon.

Typically, the corrosion inhibition system includes heterocyclic organic materials, such as azoles, mercaptans, furans and combinations thereof. Suitable mercaptans such as 2-Mercaptobenzothiazole, sold under the trademark ROTAX and are available from Rt. Vanderbilt Company, Inc., of Norwalk, Conn. Suitable azoles include Cobratec PT, Cobratec TT-505C, Cobratec TT-85, Cobratec TT-100 and Cobratec 99. Cobratec 35-G from PMC Specialties Group, Inc., Div. of PMC, Inc. Such a corrosion inhibition system provides a coating removal composition which exhibits no corrosive or minimal corrosive activity toward substrates which are being stripped of coating, in particular, intentionally colored or pigmented concretes having a colorant component.

Such a corrosion inhibition system is present in an amount of about 0.05 to 25.0 weight percent of the coating removal composition. In some embodiments, the corrosion inhibition system comprises about 0.50 to 15.0 weight percent of the composition. In alternative embodiments of the coating removal compositions, the corrosion inhibition system is present in about 1.0 to 10.0 weight percent of the coating removal composition. Still other embodiments include about 2.0 to 5.0 weight percent of the coating removal composition.

In some embodiments the ratio of weak metal binding agent to corrosion inhibition system is about 1:1 to 1:50. Some systems including 1:2 to 1:20. In other embodiments of the coating removal composition, the ratio of weak metal binding agent to corrosion inhibition system is approximately 1:4.

The inventive composition may also optionally include at least one inorganic alkaline salt. Inorganic alkaline salts suitable for use can include lithium carbonate, potassium carbonate, sodium carbonate, lithium hydroxide, potassium hydroxide, sodium hydroxide, lithium silicates, sodium silicates, potassium silicates, lithium phosphates in all forms, sodium phosphates, potassium phosphates, and combinations thereof are all suitable for use in the present composition. All forms of such salts are suitable for use including various hydration grades, mono-, di-, tri-, ortho- and pyro-forms. Additional useful inorganic alkaline salts include citrates, and polyphosphates, e.g. sodium tripolyphosphate and sodium tripolyphosphate hexadydrate, potassium tripolyphosphate and mixed sodium and potassium tripolyphosphate salts; and partially water-soluble or insoluble salts such as crystalline layered silicates (EP-A-0164514 and EP-A-0293640) and aluminosilicates inclusive of Zeolites A, B, P, X, HS and MAP. In one embodiment it has been found useful to utilize potassium hydroxide. Potassium hydroxide can be utilized in various forms including a 45 percent solution, solid pellet and flakes, as can other inorganic alkaline salts.

Such salt typically comprises about 0.10 to 20 weight percent of the coating removal composition. In some embodiments, the inorganic alkaline salt is about 0.10 to 10 weight percent of the composition. In some embodiments of the compositions, such salts are present at about 1.0 to about 2.0 weight percent.

The inventive coating removal composition may also optionally include at least one source of organic alkalinity, preferably an organoamine derivative, more preferably an organoamine derivative with a monoethanolamine, triethanolamine, monoisopropanalamine, diesoproanolamine, triisopropanolamine, and other organomine derivatives known to one of ordinary skill in the art.

Further, the coating removal compositions may also optionally include surfactants in varying amounts which improve surface wetting and rinseability of the product in the early and later stages of the coating removal process, reduce the impact of foam and may assist in the emulsification of the floor coating to be removed. Such attributes are improved because such surfactants lower surface tension and increase wetability. Various anionic, nonionic and amphoteric surfactants have been found useful in the coating removal compositions of the present invention. Surfactants useful in the present invention are limited only in their ability to provide sufficient wetting characteristics for the coating removal process while exhibiting an acceptable foam profile.

Suitable nonionic surfactants can be broadly defined as compounds produced by the condensation of alkylene oxide groups (hydrophilic in nature) with an organic hydrophobic compound, which may be aliphatic or alkyl aromatic in nature. The length of the hydrophilic or polyoxy alkylene radical which is condensed with any particular hydrophobic group can be readily adjusted to yield a water-soluble compound having the desired degree of balance between hydrophilic and hydrophobic elements.

Further, the coating removal compositions may also optionally include surfactants in varying amounts which improve surface wetting and rinseability of the product in the early and later stages of the coating removal process, reduce the impact of foam and may assist in the emulsification of the floor coating to be removed. Such attributes are improved because such surfactants lower surface tension and increase wetability. Various anionic, nonionic and amphoteric surfactants, and mixtures of two or more thereof have been found useful in the coating removal compositions of the present invention. Surfactants useful in the present invention are limited only in their ability to provide sufficient wetting characteristics for the coating removal process while exhibiting an acceptable foam profile or emulsification character. Thus, aqueous coating removal compositions of the present invention may include, but are not limited to, for example, surfactants such as organosulfates, organosulfonates, mono and diester organosulfosuccinates, organophosphates, polysiloxanes, polyether modified polysiloxanes, acetylene based surfactants and nonionic surfactants. Suitable nonionic surfactants can be broadly defined as compounds produced by the condensation of alkylene oxide groups (hydrophilic in nature) with an organic hydrophobic compound, which may be aliphatic or alkyl aromatic in nature. The length of the hydrophilic or polyoxy alkylene radical which is condensed with any particular hydrophobic group can be readily adjusted to yield a water-soluble compound having the desired degree of balance between hydrophilic and hydrophobic elements. Additional nonionic surfactatns can be selected from the class of fluorinated materials, such Zonyl, FSJ, Zonyl FSN, etc., commercially available from DuPont. Additional surfactants that may be added include the alkali metal and amine salts of higher fatty acids having, for example, 12 to 18 carbon atoms such as salts of tall oil fatty acid.

Suitable anionic surfactants can be broadly described as the water-soluble salts, particularly the alkali metal salts, of organic sulfur reaction products having in their molecular structure an alkyl radical containing from about 8 to about 22 carbon atoms and a radical selected from the group consisting of sulfamic acid and sulfuric acid ester radicals. Such surfactants are well known in the art and are described at length in "Surface Active Agents and Detergents", Vol. II by Schwartz, Perry and Berch, Interscience Publishers Inc., 1958, incorporated by reference herein.

In one embodiment of the inventive composition the surfactants are about 0.25 to 10.0 weight percent of the coating removal composition. In some embodiments of the inventive composition, the surfactants are about 1.0 to 8.0 weight percent of the coating removal composition. In some embodiments of the inventive composition, the surfactants are about 2.0 to 5.0 weight percent of the coating removal composition.

The inventive coating removal composition may also optionally include at least one coupling agent, or hydrotrope. Coupling agents assist in providing stability to the resulting coating removal composition. Coupling agents present in the inventive composition include fatty acid salts, aromatic sulfonate derivatives, phosphate esters or mixtures thereof. In some embodiments of the inventive composition, sodium xylene sulfonate is 1 to 20 weight percent of the inventive composition. In one embodiment, sodium xylene sulfonate is 2 to 5 weight percent of the inventive composition.

Such coating removal compositions have been found to effectively remove coatings from cementatious, stone or concrete substrates or surfaces. Of particular benefit is that the inventive composition is non-damaging or imparts little damage to decorative concrete substrates. This is particularly the case for those concretes that are intentionally dyed, stained, colored or pigmented.

The coating removal compositions are applied to such coated substrates to be stripped by any number of techniques including, for example, mopping, pouring, spraying, sprinkling, brushing, immersing, etc. the inventive coating removal composition onto the coated substrate, such as concrete, to be treated or stripped. The coating removal composition is then allowed to remain on the surface for a period of time. Typically, the coating removal composition can be applied to the surface and left to stand in contact with the surface for a period of about 5-30 minutes, however longer or shorter periods of time are possible. After such time, the coating removal composition is removed from the surface along with the emulsified coating by any number of methods known to one of ordinary skill in the art including mopping, spraying, using an automatic scrubber, vacuuming, or flushing with water, etc. The thus treated cementatious or concrete substrate is then allowed to dry.

In some embodiments, the intentionally colored concrete retains at least 70% of the colorant component after utilizing the coating removal composition to remove a coating or finish therefrom. In some embodiments, the intentionally colored concrete retains at least 80% of the colorant component. In other embodiments, the intentionally colored concrete floor retains at least 90% of the colorant component. In still other embodiments, the intentionally colored concrete floor retains at least 95% of the colorant component. In other embodiments, the intentionally colored concrete floor retains at least 99% of the colorant component.

EXAMPLES

In preparing examples of the coating removal compositions, the following steps are used.

A vessel is charged with an appropriate amount of deionized water. With agitation, an appropriate amount of Dowanol Butyl cellosolve is added. With agitation, an appropriate amount of Benzyl Alcohol is then added to solution. With agitation, an appropriate amount of Rhodia Mirataine JCHA is added to solution. With agitation, anappropriate amount of Dupont Zonyl FSO to solution. With agitation, add appropriate amount of Potassium Hydroxide (45% solution) is then added to solution. With agitation, an appropriate amount of Cobratec 35-G or Tomah E-14-5 is then added to solution. With agitation, an appropriate amount of Sodium Xylene Sulfonate (40% solution) is then added. Let mix for 10 minutes.

The following coating removal compositions, Examples 1-3 of Table 1 were prepared and evaluated.

TABLE 1

| Raw Material | Example 1 (W83-1 Prototype) wt/wt % | Example 2 (W83-2 Prototype) wt/wt % | Example 3 (W83-3 Prototype) wt/wt % |
| --- | --- | --- | --- |
| Deionized Water | 73.40 | 70.40 | 79.40 |
| Dowanol Butyl cellosolve | 5.00 | 5.00 | 5.00 |
| Benzyl Alcohol | 2.00 | 0.00 | 2.00 |
| Sodium Xylene Sulfonate SXS - 40% | 7.00 | 7.00 | 7.00 |
| Mirataine JCHA | 2.00 | 2.00 | 2.00 |
| Dupont Zonyl FSO | 0.10 | 0.10 | 0.10 |
| Potassium Hydoroxide KOH | 0.50 | 0.50 | 0.50 |
| Cobratec 35-G | 10.00 | — | 2.00 |
| Tomah E-14-5 | — | 15.00 | 2.00 |
| Total | 100.00 | 100.00 | 100.00 |

These Example compositions 1-3 and several commercially available stripper compositions were evaluated for stripping performance using a modified ASTM D 1792-82 as follows:

A vinyl composition tile was utilized for each evaluation. This tile was coated with Signature floor finish from Johnson-Diversey, Inc., Sturtevant, Wis. as outlined in the ASTM. Ten coats of finish were applied. The stripper or coating removal compositions evaluated were the Examples 1-3 and prior art compositions from Betco Corp. of Toledo, Ohio; AmSan of Pompano Beach, Fla.; Buckeye International, JohnsonDiversey, Inc. of Sturtevant, Wis. and the ASTM Standard Stripper from ASTMD 1792-82.

For removability evaluation, 30 grams of 1:1 dilution (stripper to water) was added to apparatus. After 5 minutes of dwell time, the motor is started for one cycle. The number of oscillations required to remove each coat of finish and the total number of oscillation cycles required to remove all coats of finish is then recorded. (The total number is shown in Table 2.) The ranking system of ASTM D 1436 was used to assess performance. The stripping results are found in Table 2.

To evaluate color removal or affect on the colorant component of intentionally colored concrete by a stripper, the following method was utilized. The inventive compositions and prior art compositions were evaluated as follows:

Into a 500 mL large mouth jar was inserted one Fern Green (CS-11) concrete block with stain applied sample tile (approx. 5 cm×4 cm) from the Lithochrome Chemstain series (ex. Scofield). To the jar was added 100 mL of the stripper composition to be tested. After standing for 3 hours, a 1.5 mL sample of the stripper composition was removed from the jar and analyzed by UV/vis spectroscopy ("spent coating removal composition"). Fresh, unused, unspent stripper sample was used as a control for comparison of the absorbance. The absorbance was measured from 360 to 1100 nm utilizing UV-VIS spectroscopy. Overall, compositions of the present invention exhibit absorbance readings of less than 0.05 (utilizing a 1 cm pathlength polyethylene cell) in the wavelength range of 360 to 1100 nm. The results of such evaluations are found in Table 2

TABLE 2

| Product | Removal* (# of cycles to remove said coat) | Color removal **-Fern Green | Absorbance ***-Fern Green | Color removal **-Weathered Bronze | Absorbance ***-Weathered Bronze |
|---|---|---|---|---|---|
| Becto Ax-it | 40; Excellent | 1 | 0.074 | 1 | 0.274 |
| AmSan Renown | 10; Excellent | 1 | 0.277 | 1 | 0.295 |
| Buckeye Juggernaut | 50; Good | 1 | 0.122 | 2 | 0.056 |
| JD Linosafe | 20; Excellent | 2 | 0.135 | 2 | 0.116 |
| ASTM Standard Stripper | 200+; Poor | 1 | 0.211 | 1 | 0.155 |
| Example 1 | 85; Good | 5 | 0.025 | 5 | 0.043 |
| Example 2 | 200+; Poor | 3 | 0.033 | 3 | 0.055 |
| Example 3 | 185; Fair | 5 | 0.003 | 5 | 0.004 |

Notes:
*Results are based from Modified ASTM D 1792-82 Standard Test Method for Long-Term Removability Properties of Emulsion Floor Polishes
**Results are based from a visual rating system (1-5); where 1 = Most color loss and 5 = No visual color loss.
***Results are based from UV-Vis spectroscopy data taken in the visual range 360-1100 nm. Absorbance recorded at the maximum wavelength in this range.

While various embodiments have been illustrated and described, it should be understood that changes and modifications can be made therein in accordance with one of ordinary skill in the art without departing from the invention in its broader aspects. Various features of the invention are defined in the following claims.

We claim:

1. A method of removing a polymeric coating that has been applied to an intentionally colored concrete floor having a metal-based colorant component that alters the visible color of the concrete from its natural color, the method comprising:
   a) applying a coating removal composition to the polymeric coating for a period of time sufficient for the coating removal composition to penetrate and emulsify the polymeric coating; and
   b) removing the coating removal composition and the polymeric coating from the floor, wherein the intentionally colored concrete floor retains at least 70% of the colorant component after removal of the polymeric coating;
   wherein the coating removal composition comprises:
   about 0.5 to 25.0 weight percent of at least one weak metal binding agent, wherein the weak metal binding agent is a primary or secondary ethoxylated amine;
   a solvent system comprising at least one alcohol or ester; and
   about 0.5 to 25.0 weight percent of a corrosion inhibition system.

2. The method of claim 1, wherein the weak metal binding agent comprises about 0.5 to 15.0 weight percent of the coating removal composition.

3. The method of claim 1, wherein the at least one alcohol is a polyhydric alcohol.

4. The method of claim 3, wherein the polyhydric alcohol includes an alkane polyol having from 2 to 6 carbon atoms and from 2 to 3 hydroxyl groups.

5. The method of claim 4, wherein the polyhydric alcohol is selected from the group consisting of ethylene glycol, propylene glycol, dipropylene glycol, glycerin, 1,2-butanediol, 1,3-butanediol, 1,4-butanediol, 2,3-butanediol, 1,2-propanediol, 1,5-pentanediol, meso-erythritol, neopentyl glycol, pentaerythritol, and blends thereof.

6. The method of claim 1, wherein the at least one alcohol is an aromatic alcohol.

7. The method of claim 6, wherein the aromatic alcohol is selected from the group consisting of benzyl alcohol, xylenol, phenol, and blends thereof.

8. The method of claim 1, wherein the at least one alcohol is a monoalcohol.

9. The method of claim 1, wherein the ester is selected from the group consisting of propylene glycol dibenzoate, dipropylene glycol dibenzoate, polypropylene glycol dibenzoate, ethylene glycol dibenzoate, diethylene glycol dibenzoate, polyethylene glycol dibenzoate, neopentyl glycol dibenzoate, and the like as well as isodecyl benzoate, dipropylene glycol monomethyl ether benzoate, 2,2,4-trimethyl-1,3-pentanediol diisobutyrate, and blends thereof.

10. The method of claim 1, wherein the solvent system comprises about 0.50 to 98.5 weight percent of the coating removal composition.

11. The method of claim 1, wherein the corrosion inhibition system includes a heterocyclic organic material.

12. The method of claim 11, wherein the heterocyclic organic material is selected from the group consisting of azoles, mercaptans, furans, and combinations thereof.

13. The method of claim 1, wherein the corrosion inhibition system comprises about 0.5 to 15.0 weight percent of the coating removal composition.

14. The method of claim 1, wherein the coating removal composition further comprises an inorganic alkaline salt.

15. The method of claim 14, wherein the inorganic alkaline salt is selected from the group consisting of lithium carbonate, potassium carbonate, sodium carbonate, lithium hydroxide, potassium hydroxide, sodium hydroxide, lithium silicates, sodium silicates, potassium silicates, lithium phosphates in all forms, sodium phosphates, potassium phosphates, and combinations thereof.

16. The method of claim 15, wherein the inorganic alkaline salt comprises about 0.05 to 25.0 weight percent of the coating removal composition.

17. The method of claim 1, wherein a weight ratio of weak metal binding agent to corrosion inhibition system in the coating removal composition is about 1:4.

18. The method of claim 1, wherein the polymeric coating is an epoxy-, urethane- or acrylic-based coating.

19. The method of claim 1, wherein the weak metal binding agent comprises about 0.5 to 10.0 weight percent of the coating removal composition.

20. The method of claim 1, wherein the weak metal binding agent comprises about 0.5 to 5.0 weight percent of the coating removal composition.

21. The method of claim 1, wherein the weak metal binding agent comprises about 3.0 to 25.0 weight percent of the coating removal composition.

22. The method of claim 1, wherein the weak metal binding agent comprises about 3.0 to 15.0 weight percent of the coating removal composition.

23. The method of claim 1, wherein the weak metal binding agent comprises about 3.0 to 10.0 weight percent of the coating removal composition.

24. The method of claim 1, wherein the weak metal binding agent comprises about 3.0 to 5.0 weight percent of the coating removal composition.

25. The method of claim 1, wherein the corrosion inhibition system comprises about 0.5 to 10.0 weight percent of the coating removal composition.

26. The method of claim 1, wherein the corrosion inhibition system comprises about 0.5 to 5.0 weight percent of the coating removal composition.

27. The method of claim 1, wherein the corrosion inhibition system comprises about 1.0 to 25.0 weight percent of the coating removal composition.

28. The method of claim 1, wherein the corrosion inhibition system comprises about 1.0 to 15.0 weight percent of the coating removal composition.

29. The method of claim 1, wherein the corrosion inhibition system comprises about 1.0 to 10.0 weight percent of the coating removal composition.

30. The method of claim 1, wherein the corrosion inhibition system comprises about 1.0 to 5.0 weight percent of the coating removal composition.

31. The method of claim 1, wherein the corrosion inhibition system comprises about 2.0 to 25.0 weight percent of the coating removal composition.

32. The method of claim 1, wherein the corrosion inhibition system comprises about 2.0 to 15.0 weight percent of the coating removal composition.

33. The method of claim 1, wherein the corrosion inhibition system comprises about 2.0 to 10.0 weight percent of the coating removal composition.

34. The method of claim 1, wherein the corrosion inhibition system comprises about 2.0 to 5.0 weight percent of the coating removal composition.

35. The method of claim 1, wherein the coating removal composition has a weight ratio of weak metal binding agent to corrosion inhibition system of about 1:1 to 1:50.

36. The method of claim 1, wherein the coating removal composition has a weight ratio of weak metal binding agent to corrosion inhibition system of 1:2 to 1:50.

37. The method of claim 1, wherein the coating removal composition has a weight ratio of weak metal binding agent to corrosion inhibition system of about 1:4 to 1:50.

38. The method of claim 1, wherein the coating removal composition has a weight ratio of weak metal binding agent to corrosion inhibition system of about 1:1 to 1:20.

39. The method of claim 1, wherein the coating removal composition has a weight ratio of weak metal binding agent to corrosion inhibition system of 1:2 to 1:20.

40. The method of claim 1, wherein the coating removal composition has a weight ratio of weak metal binding agent to corrosion inhibition system of about 1:4 to 1:20.

41. A method of removing a polymeric coating that has been applied to an intentionally colored concrete floor having a metal-based colorant component that alters the visible color of the concrete from its natural color, the method comprising:
   a) applying a coating removal composition to the polymeric coating for a period of time sufficient for the coating removal composition to penetrate and emulsify the polymeric coating; and
   b) removing the coating removal composition and the polymeric coating from the floor, wherein the intentionally colored concrete floor retains at least 70% of the colorant component after removal of the polymeric coating;
   wherein the coating removal composition comprises:
   at least one weak metal binding agent, wherein the weak metal binding agent is an ethoxylated amine;
   a solvent system comprising at least one alcohol or ester; and
   a corrosion inhibition system;
   wherein the coating removal composition has a weight ratio of weak metal binding agent to corrosion inhibition system of about 1:1 to 1:50.

* * * * *